United States Patent [19]
Lane

[11] 3,725,634
[45] Apr. 3, 1973

[54] METHOD OF FORMING T-SLOTS IN A MACHINE TOOL TABLE

[75] Inventor: Kenneth H. Lane, Elm Grove, Wis.

[73] Assignee: Kearney & Trecker Corporation, West Allis, Wis.

[22] Filed: Feb. 17, 1971

[21] Appl. No.: 115,978

[52] U.S. Cl.............219/121 EM, 29/472.1, 29/493, 29/423
[51] Int. Cl. .............................................B23k 15/00
[58] Field of Search...219/121 EB, 121 EM, 76, 137, 219/62; 29/423, 493, 472.1

[56] References Cited

UNITED STATES PATENTS

| | | | |
|---|---|---|---|
| 2,491,878 | 12/1949 | Spagnola | 219/62 X |
| 2,015,246 | 9/1935 | Taylor | 219/137 X |
| 3,566,071 | 2/1971 | Matchett et al. | 219/121 EM |
| 3,427,706 | 2/1969 | Jaffee | 29/423 X |
| 3,533,153 | 10/1970 | Melill et al. | 29/472.1 X |
| 3,044,160 | 7/1962 | Jaffee | 29/423 |

OTHER PUBLICATIONS

"Electric Railroads and Shops" Electric Arc Welding, October 15, 1918, 1 page.

Primary Examiner—J. V. Truhe
Assistant Examiner—Gale R. Peterson
Attorney—Cyril M. Hajewski and Donald E. Porter

[57] ABSTRACT

Forming T-slots in a machine tool table by positioning a pair of throat strips in spaced relationship within a suitable groove provided in the table. The throat forming strips are supported in desired position by a removable supporting filler bar and are maintained in intimate contact with the groove side wall by wedge strips. The joint formed by the contact of each throat strip and the adjacent side wall of the table groove is subjected to a beam obtained from an electron beam welder to fuse the contacting surfaces into a unit structure.

5 Claims, 4 Drawing Figures

PATENTED APR 3 1973  3,725,634

INVENTOR
Kenneth H. Lane
BY Robert C. Jones
ATTORNEY

METHOD OF FORMING T-SLOTS IN A MACHINE TOOL TABLE

SUMMARY OF THE INVENTION

The basic method of holding workpieces or fixtures to a machine tool work table is by means of T-bolts engaged in T-slots formed in the table. The T-slot form is generally machined into the solid material of the table and such forming is usually accomplished in two steps. First, a slotting cutter is used to mill the throat portion of the T-slot to the desired width and depth. In the second step, the head space of the T-slot is formed by utilizing a T-slot cutter. These milling operations, of course, are performed at a relatively low feed rate and on machines having a high cost per hour rate. Thus, the forming of the T-slot in the table is both costly and time consuming, contributing to the overall cost of the entire machine tool.

A method has been found to fabricate the T-slots in a machine table which materially reduced the cost and time required to form T-slots. The machine tool table is channel milled to provide the required number of T-slot channels. These channels are formed to the full depth and to the full head width dimension to accommodate the T-bolt to be utilized therein. A support filler bar is inserted into the channel, and two strips are supported thereon. The two strips will function as the shoulders against which the T-bolt head will engage for clamping purposes and are supported in position against the sides of the channel with their top surfaces disposed so as to be in the same plane as the top surface of the work table. A pair of wedges are inserted in the space between the two strips, forcing the strips into intimate contact with the adjacent sides of the channel in which they are located. The fusion of the strips with the sides of the channel is then accomplished by an electron beam welder.

DESCRIPTION OF THE PREFERRED EMBODIMENT

Figure 1:
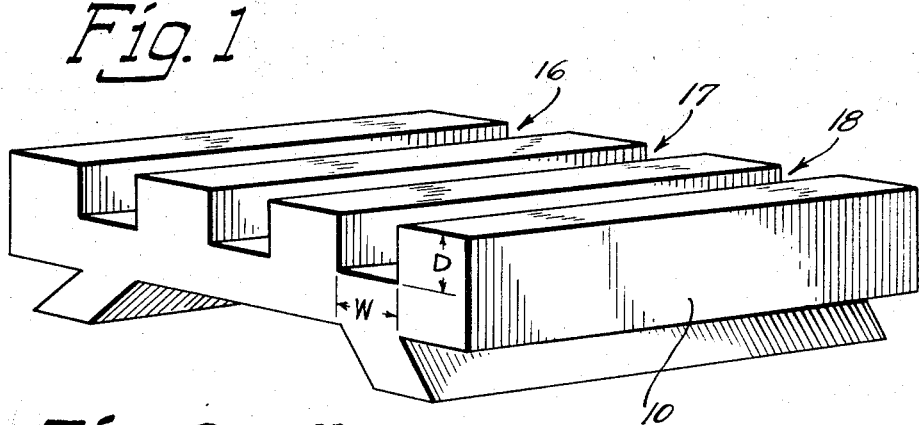
FIG. 1 is a perspective view of a machine tool table in which channels have been formed.

Referring now to the drawings, in performing the method of this invention, a machine tool table 10 having formed therein a plurality of spaced parallel channels 16, 17 and 18 which are formed therein as by a milling operation. The number of channels formed in the table 10 are equal to the number of T-slots that it is desired that the table have. Since the channels 16, 17 and 18 are identical and the fabrication of the T-slot form for each is the same, the description given herein will be in respect to the channel 18, and the description thereof will apply to the method of forming the T-slots in all the channels.

The depth dimension D of the channel 18 is equal to the depth of throat plus the depth of the head space that it is desired that the fabricated finish T-slot have. The width dimension W of the channel 18 is equal to the desired head space dimension established for the finished T-slot.

Figure 3:
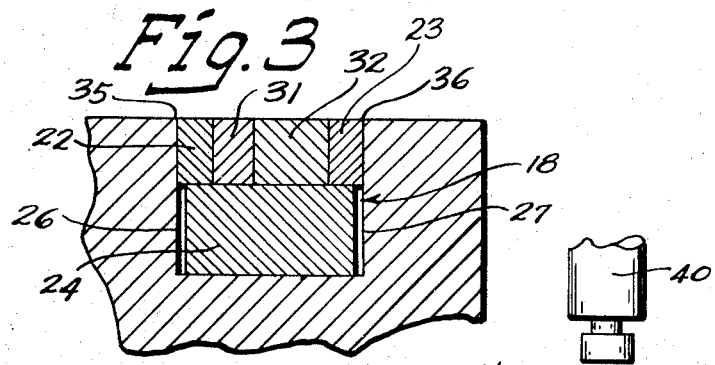
FIG. 3 is a detailed fragmentary view in horizontal section taken along the plane represented by the line 3—3 in FIG. 2; and, FIG. 4 is a perspective view of the table shown in FIG. 1 after the strips have been fused and the wedges and support filler bar removed.
Figure 2:
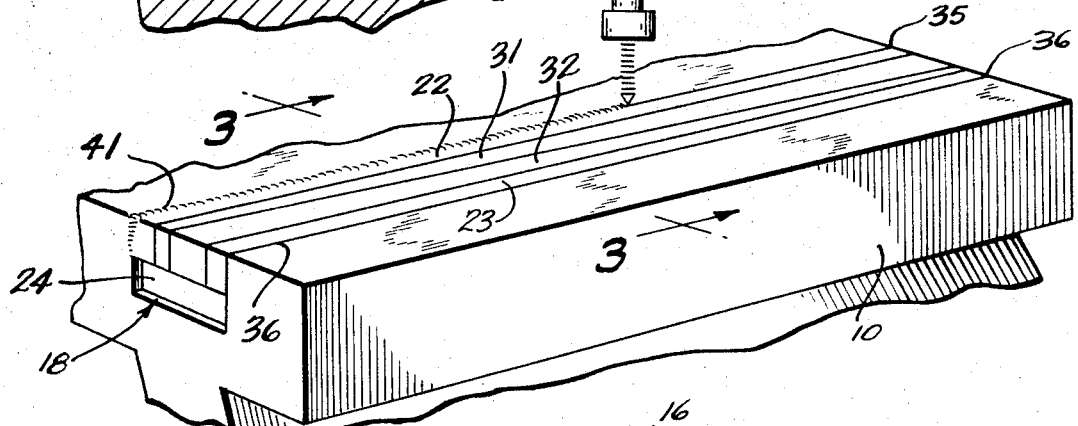
FIG. 2 is an enlarged fragmentary perspective view of a portion of the table shown in FIG. 1, showing the support filler bar, strips and wedges in position within a channel.

To form the throat 21 in the channel 18, a pair of ferrous metal strips 22 and 23 equal in length to the length of the channel 18 are positioned within the channel 18 in abutting relationship with the sides of the channel, as depicted in FIGS. 2 and 3. Each strip 22 and 23 is disposed so that its upper surface is in the same plane as the upper surface of the table 10. To position and maintain the strips in the desired positions, a supporting bar 24 is first inserted into the channel 18. The supporting bar 24 is readily available mill stock of standard mill dimensions so that no forming or processing of the strip 24 is necessary other than shearing to obtain the desired length. The length of each strip 22 and 23 is the same as the length of the channel. The milled width dimension W of the channel is slightly larger than the standard width dimension of the mill stock so that a clearance 26 and 27 is obtained between the ides of the supporting bar and the adjacent side walls of the channel 18.

With the supporting bar 24 disposed in position in the channel, the strips 22 and 23 are supported in position within the channel 18 on top of the bar 24 in a position adjacent to an associated side wall of the channel. The strips 22 and 23 are locked in the desired position by operation of a pair of wedge bars 31 and 32 which are interengaged and operate to force the strips 22 and 23 into intimate contact with the adjacent vertical side wall surfaces of the channel 18.

The area of contact between the side surface of the strip 22 and the adjacent vertical side wall surface of the channel 18 is identified as joint 35. Similarly, the area of contact between the side surface of the strip 23 and the adjacent vertical opposite side wall surface of the channel 18 is identified as joint 36, as depicted in FIG. 2.

Figure 4:
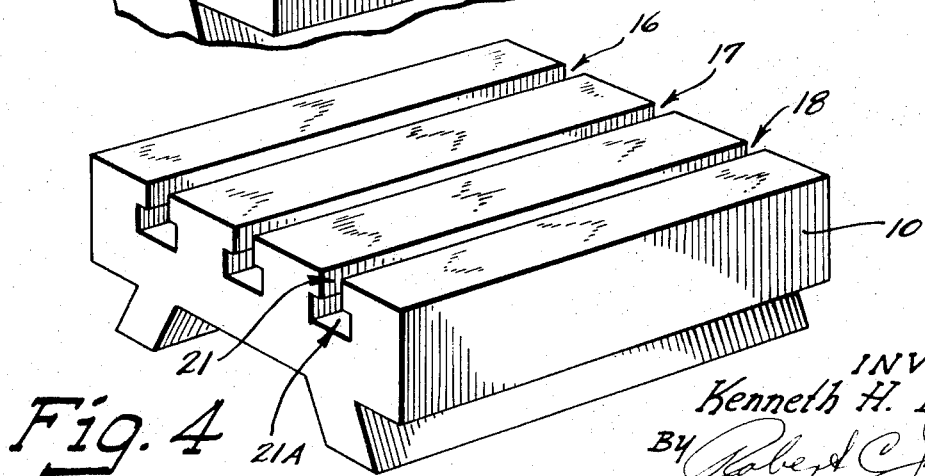

With the strips 22 and 23 assembled within the channel 18 as described, the joints 35 and 36 are progressively subjected to a beam obtained from an electron beam welder 40 which effects a fusion of the metal of the strips 22 and 23 with the material of the table 10, as depicted in FIG. 3. This fusion combines the materials so that a complete loss of identity of the separate parts is obtained. As the beam obtained from the electron beam welder 40 is progressively moved along the joints 35 and 36, by the relative movement of the table with respect to the welder 40, a slight bead 41 is formed which is removed by grinding the top surface of the table 10 after the fabrication of all table T-slots have been accomplished. With the strips 22 and 23 fused in place in the channel 18, the wedge bars 31 and 32 are removed as is the bar 24. Each channel of the table 10 is similarly fabricated to obtain a work table, as depicted in FIG. 4, in which T-slots having throat portions 21 and head grooves 21A are provided. The finished fabricated T-slots are operable to receive T-bolts (not shown) for the purpose of securing a workpiece to the table 10 in a manner well-known in the art.

With the T-slots fabricated in all of the channels as described and with the supporting bar 24 and wedges 31 and 32 removed, the top surface of the table 10 may be ground to clean the surface thereof so as to present a finished appearance, ad depicted in FIG. 4.

The under surface and the surface adjacent to the throat portion of the T-slot of the strips 22 and 23 can be hardened before the strips are placed in position in the channel. In this manner, only those surfaces that will be subjected to wear need be treated and such hardening is more easily accomplished with the relatively small, easily handled strip material than is possible with a table having the T-slots milled therein. By utilizing the supporting bar 24 for supporting the strips 22 and 23 in desired positions in the channel, the bar 24 serves as a heat sink. Thus, the under surface of the strip which is in contact with the bar 24 and which has been previously hardened, will not be annealled by the fusion process. Similarly, the wedge bars 31 and 32 also serve as heat sinks to prevent the previously hardened inner side surfaces of the strips 22 and 23 from being annealled. The support bar 24 and wedge bars 31 and 32 keep the adjacent surfaces of the strips 22 and 23, with which they are engaged, at a temperature below the drawing temperature.

Since the support 24 is of standard mill stock with its dimension being slightly less than the width dimension W of the channel, it will be centered within the channel to provide the air gaps 26 and 27 on each side thereof. Thus, when the beam of the electron beam welder penetrates down through the depth dimension of the joints, the sides of the support bar 24 will not be in the beam path and accidental fusion of the support bar to the table 10 and/or strips 22 and 23 is avoided.

The support bar is preferably of a ferrous material, however, it need not be. A copper or any copper base alloy material or even wood can be utilized for the supporting bar. By using a material for the supporting bar other than a ferrous material, the advantage of the supporting bar serving as a heat sink is not obtained. However, this does not effect the structural quality of the fabricated T-slot but merely effects the colorization of the material. The wedges 31 and 32 which are a ferrous material are sufficient to serve as a heat sink to prevent annealling of the strips.

From the foregoing detailed description of the illustrative embodiment set forth herein to exemplify the present invention, it will be apparent that there has been provided a novel method for fabricating T-slots.

The principles of this invention having now been fully explained, I hereby claim as my invention:

1. A method of fabricating a T-slot in a machine tool table comprising forming a channel in the machine tool table;
    positioning a metal strip on each side of an upper portion of the channel with a space between said metal strips to define the throat of the T-slot desired and a space beneath said metal strips constituting the head groove for receiving the head of a T-bolt; and
    fusing the material of the strips with the material of the table along the entire area of their contact to form a unitary structure.

2. A method as in claim 1 wherein a supporting member is inserted into the channel beneath said metal strips;
    said strips are of ferrous metal which are resting on the supporting member and are in intimate contact with the walls of the channel;
    said fusing step is completed by applying a beam from an electron beam welder progressively along the joint formed by the contact of the strips with the walls of the channel to fuse the material of the strips with the material of the table in the area of their contact; and
    removing the supporting member after fusion has been obtained to leave a space constituting the head groove for receiving the head of a T-bolt.

3. A method as in claim 2 wherein the upper edge surfaces of said metal strips are disposed in the plane in which the top surface of the table is located to define the throat portion of the T-slot.

4. A method as in claim 3 wherein said strips are maintained in position on the supporting member in intimate contact with the walls of the channel by a mechanical holding means; and
    said mechanical holding means are removed after fusion of the material of the strips with the material of the table is accomplished to leave a space between said metal strips which serves as the throat portion of the T-slot through which the shank of a T-bolt extends.

5. A method as in claim 4 wherein
    said mechanical holding means comprises a pair of wedge members arranged in interengaging relationship between the strips to urge and maintain the strips in intimate contact with the walls of the channel.

* * * * *